US011535398B2

(12) United States Patent
Lee et al.

(10) Patent No.: US 11,535,398 B2
(45) Date of Patent: Dec. 27, 2022

(54) STATION FOR UNMANNED AERIAL ROBOT

(71) Applicant: LG ELECTRONICS INC., Seoul (KR)

(72) Inventors: Sanghak Lee, Seoul (KR); Nakyeong Kim, Seoul (KR); Sungmin Moon, Seoul (KR); Jeongkyo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 485 days.

(21) Appl. No.: 16/799,180

(22) Filed: Feb. 24, 2020

(65) Prior Publication Data

US 2021/0047055 A1 Feb. 18, 2021

(30) Foreign Application Priority Data

Aug. 16, 2019 (KR) .......................... 10-2019-0100039

(51) Int. Cl.
*B64F 1/36* (2017.01)
*B64C 39/02* (2006.01)
*B64F 1/00* (2006.01)
*B64F 1/18* (2006.01)

(52) U.S. Cl.
CPC .............. *B64F 1/36* (2013.01); *B64C 39/024* (2013.01); *B64F 1/005* (2013.01); *B64F 1/18* (2013.01); *B64C 2201/027* (2013.01)

(58) Field of Classification Search
CPC .... B64F 1/36; B64F 1/005; B64F 1/18; B64C 39/024; B64C 2201/027
USPC ....................................... 244/114 R
See application file for complete search history.

(56) References Cited

U.S. PATENT DOCUMENTS 10,467,685 B1 * 11/2019 Brisson ..................... B64F 1/36
2018/0092484 A1 * 4/2018 Lewis ................... B64C 39/024

FOREIGN PATENT DOCUMENTS

JP 2018-528123 A 9/2018
KR 10-2017-0040960 A 4/2017

* cited by examiner

*Primary Examiner* — Gertrude Arthur Jeanglaude
(74) *Attorney, Agent, or Firm* — Birch, Stewart, Kolasch & Birch, LLP

(57) ABSTRACT

Provided is a station for an unmanned aerial robot includes a control box having a landing surface formed with a guide mark which guides a landing point of the unmanned aerial robot, an elevator disposed in the control box and movable vertically, and a landing stand coupled to the elevator and have a height of a highest point located at least above the landing surface during vertical movement. The present disclosure can be linked with an artificial intelligence module, a robot, an augmented reality (AR) device, a virtual reality (VR) device, devices related to 5G services and the like.

20 Claims, 16 Drawing Sheets

[FIG. 1]
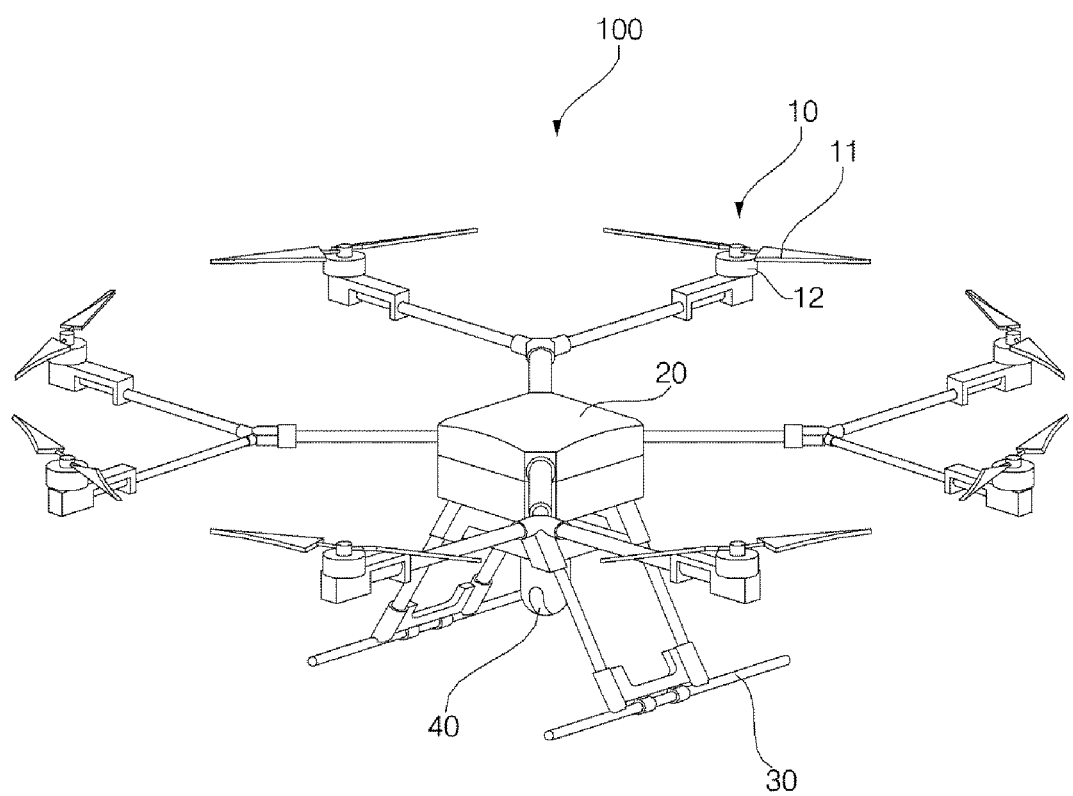

[FIG. 2]
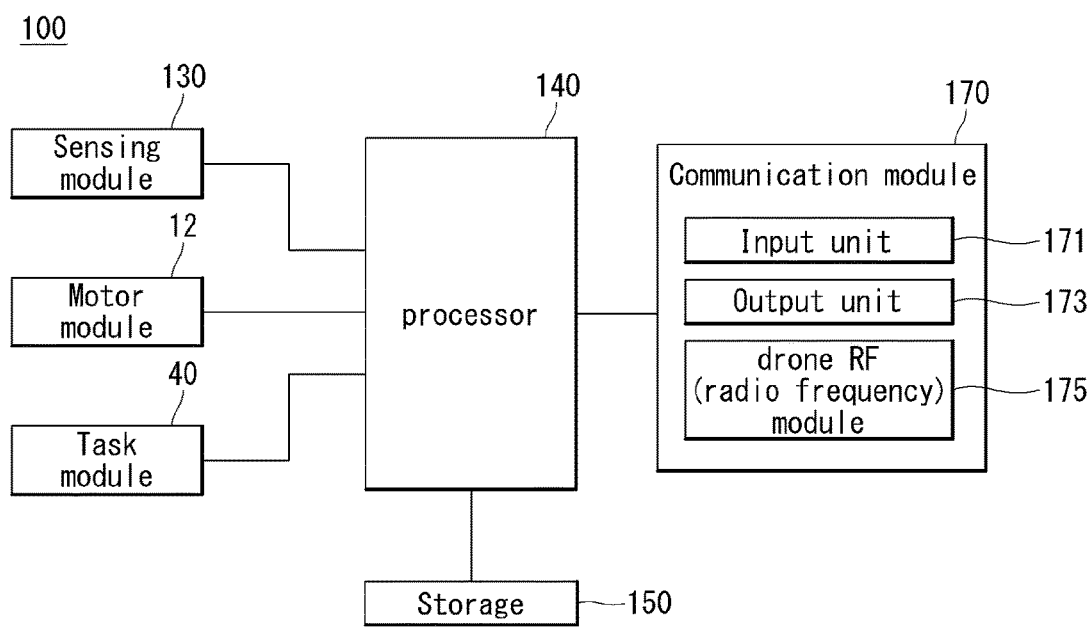

[FIG. 3]
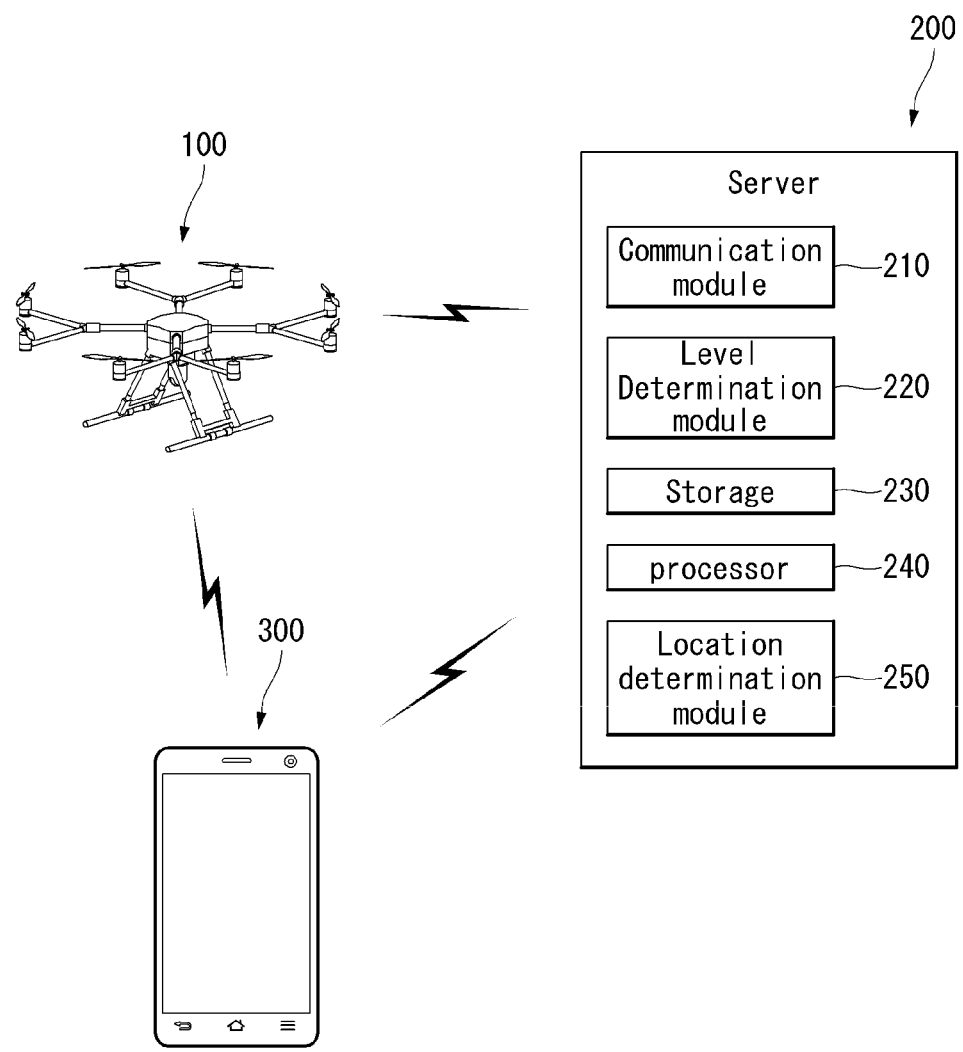

[FIG. 4]
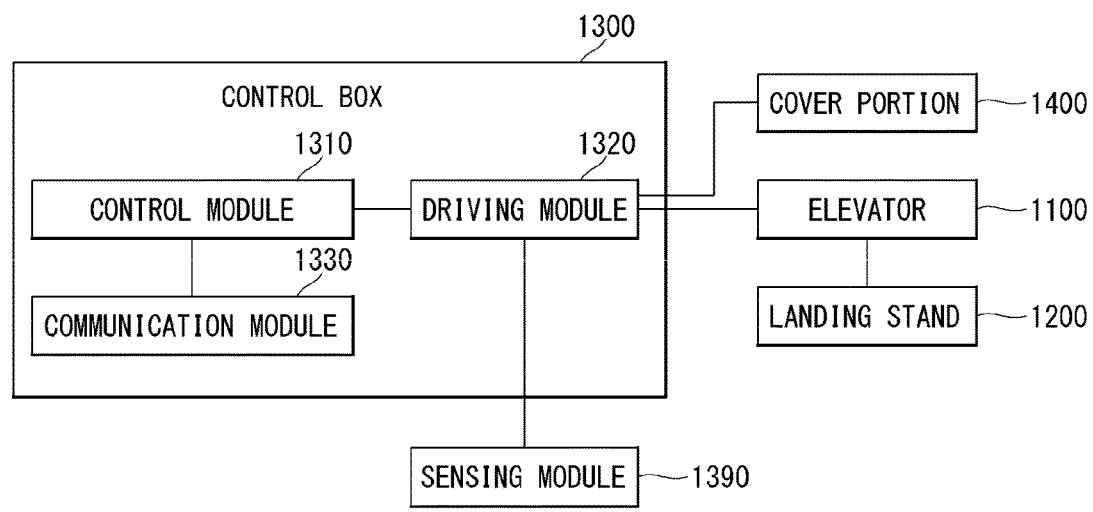

[FIG. 5]
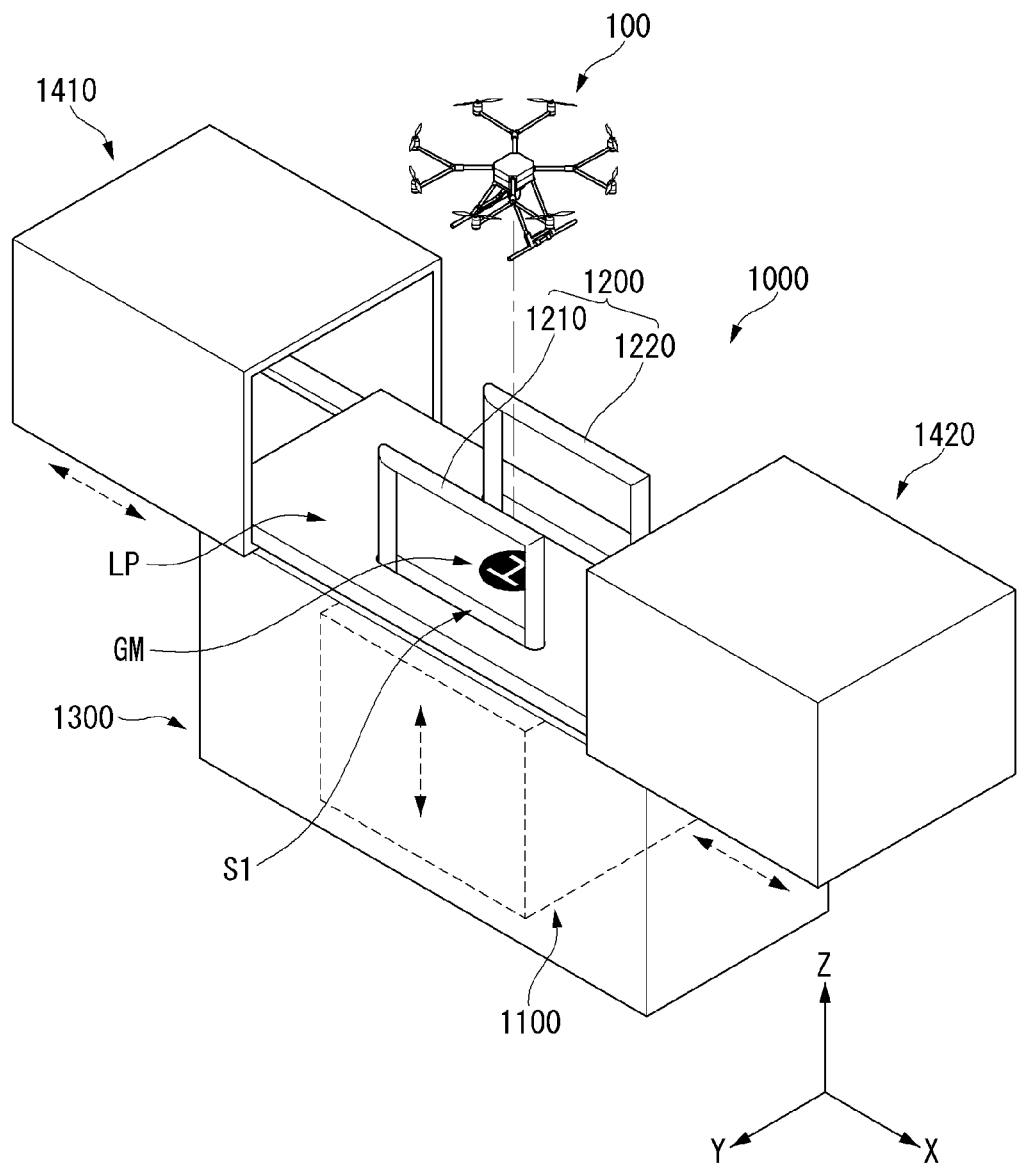

[FIG. 6]
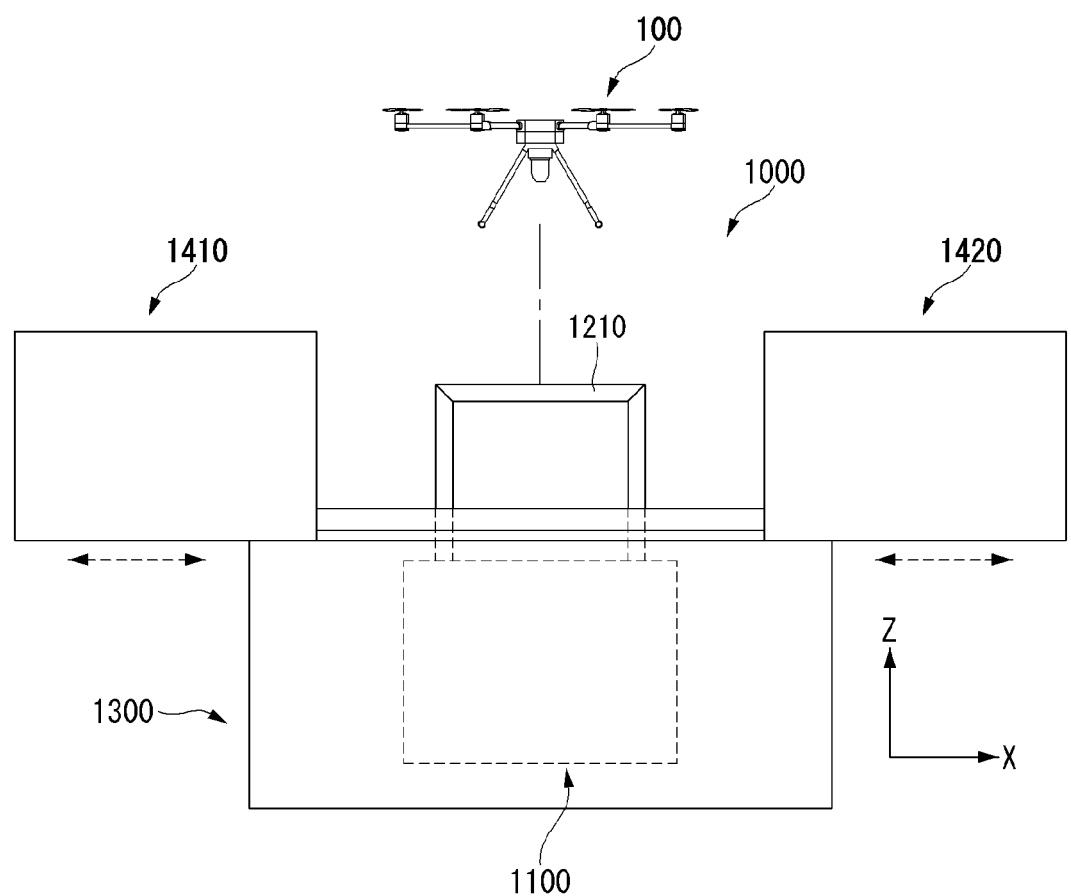

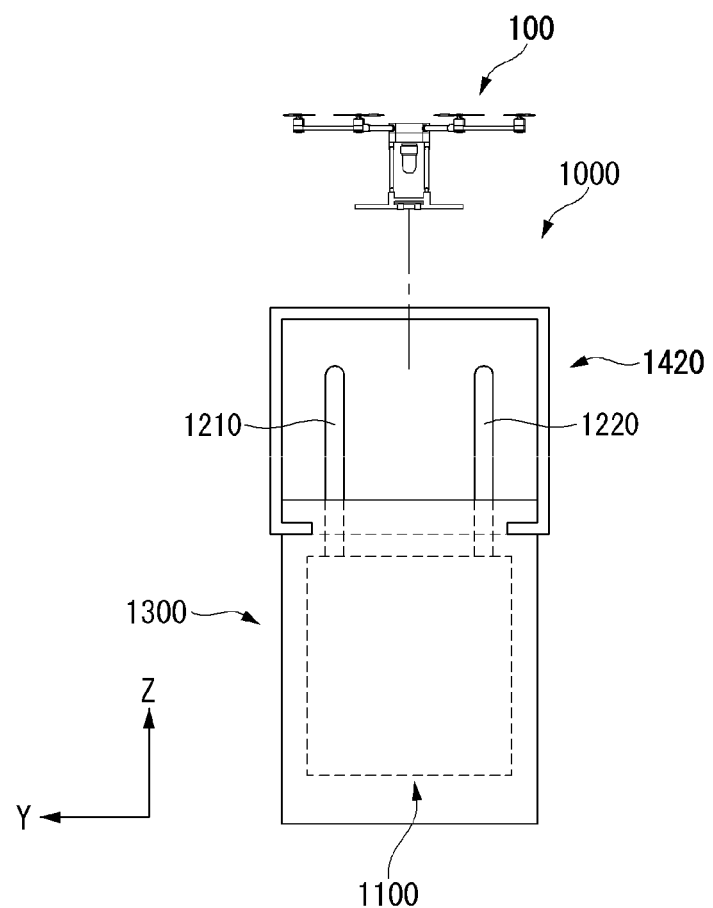
[FIG. 7]

[FIG. 8]
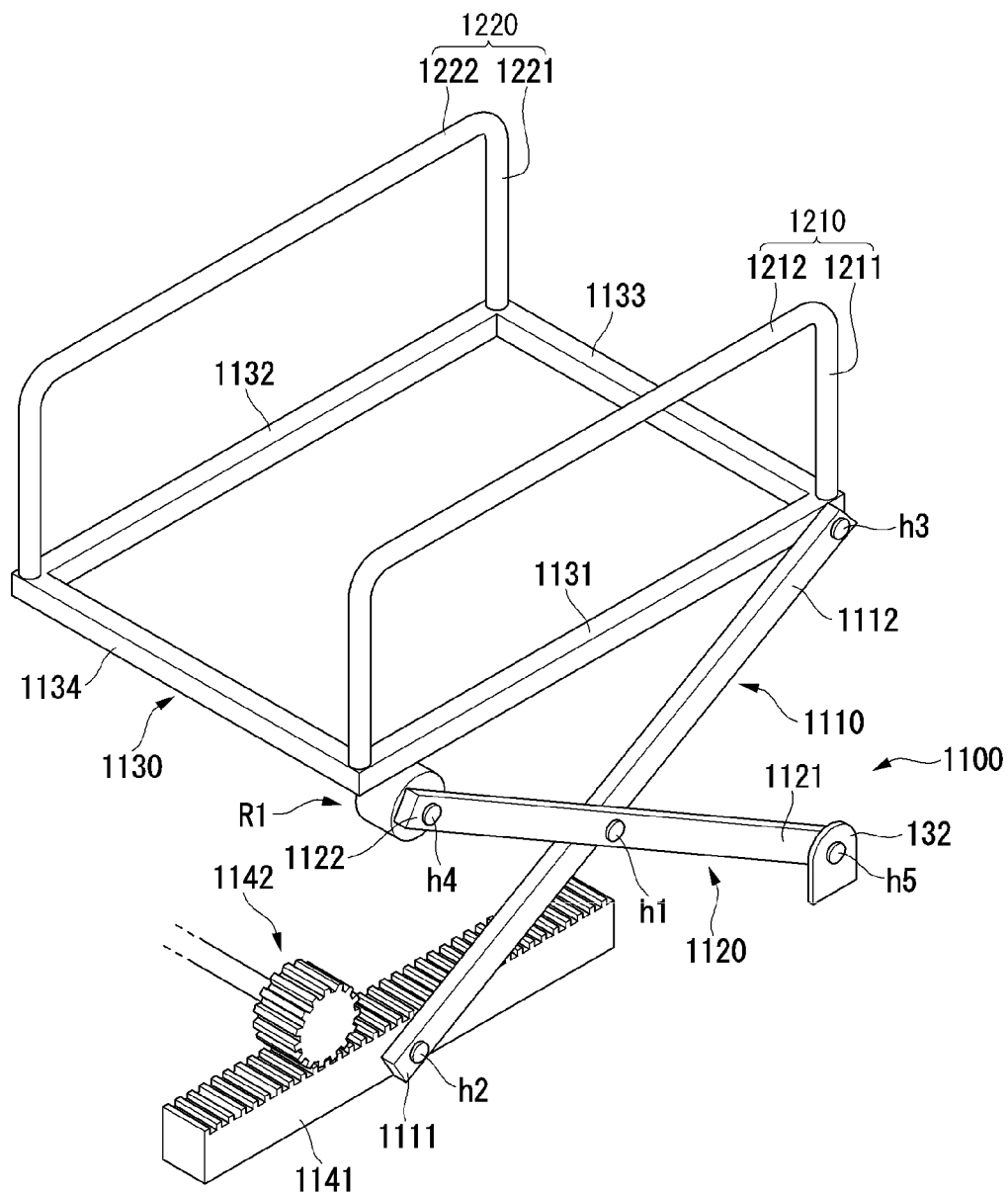

[FIG. 9]
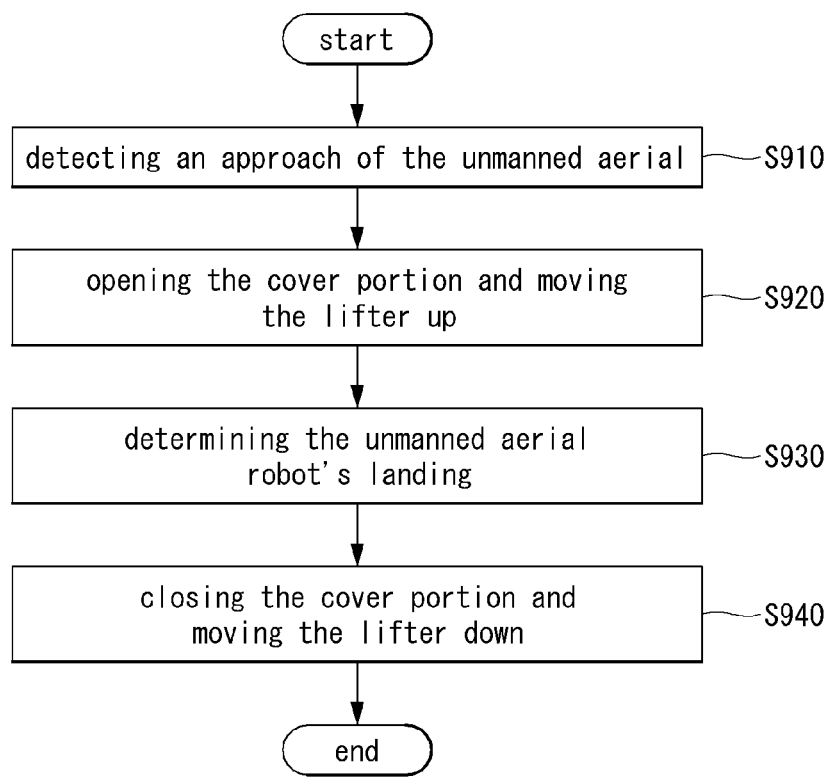

[FIG. 10]
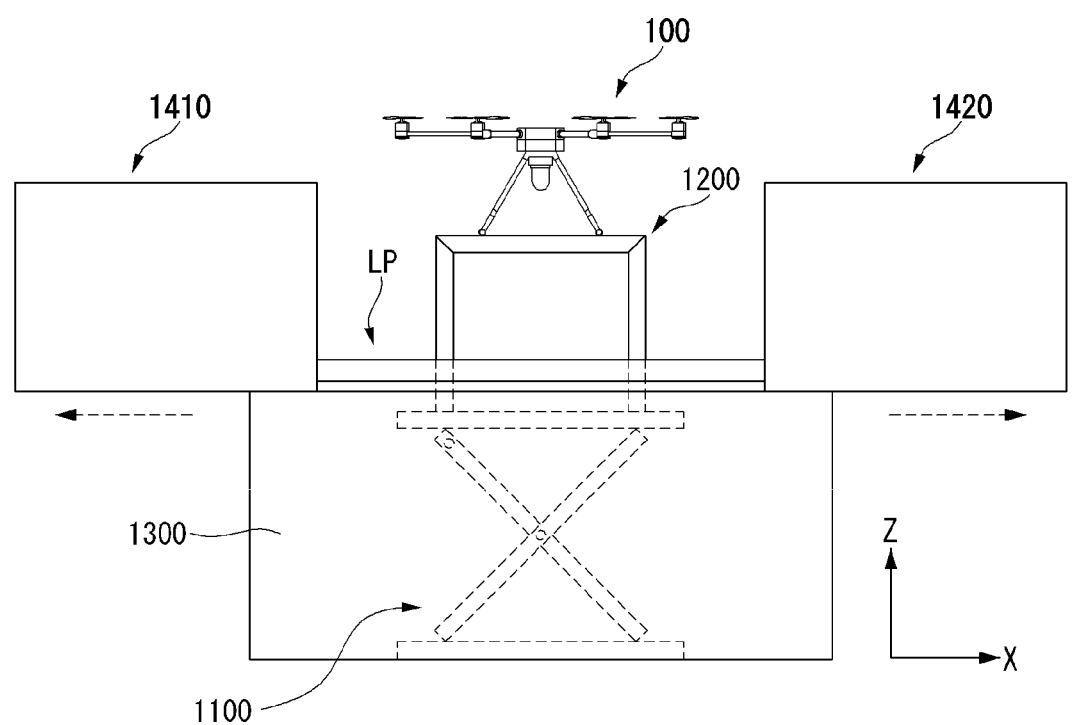

[FIG. 11]
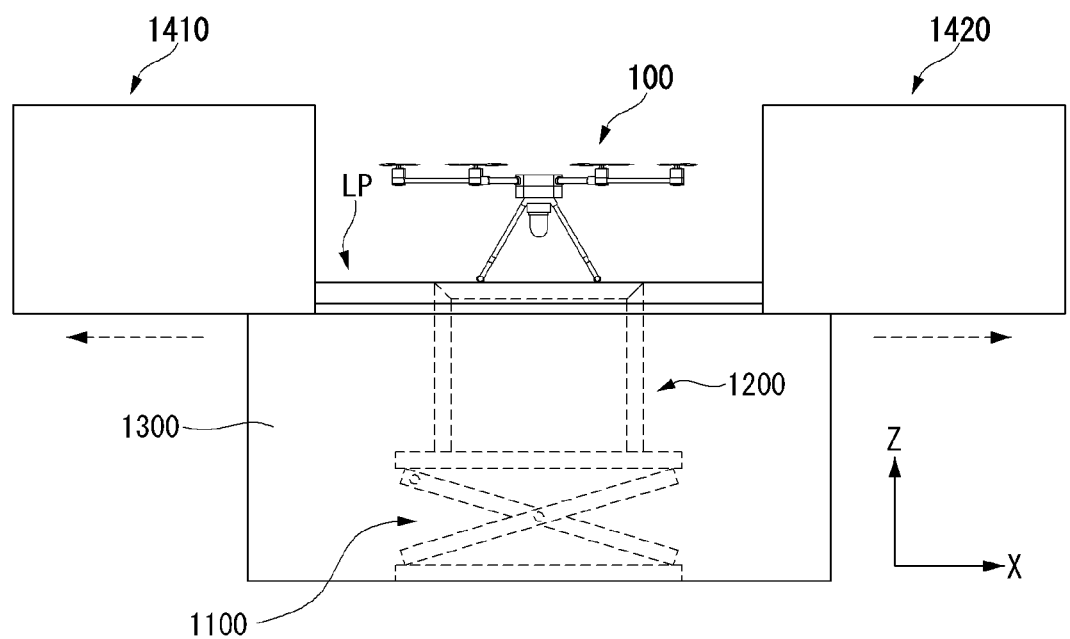

[FIG. 12]
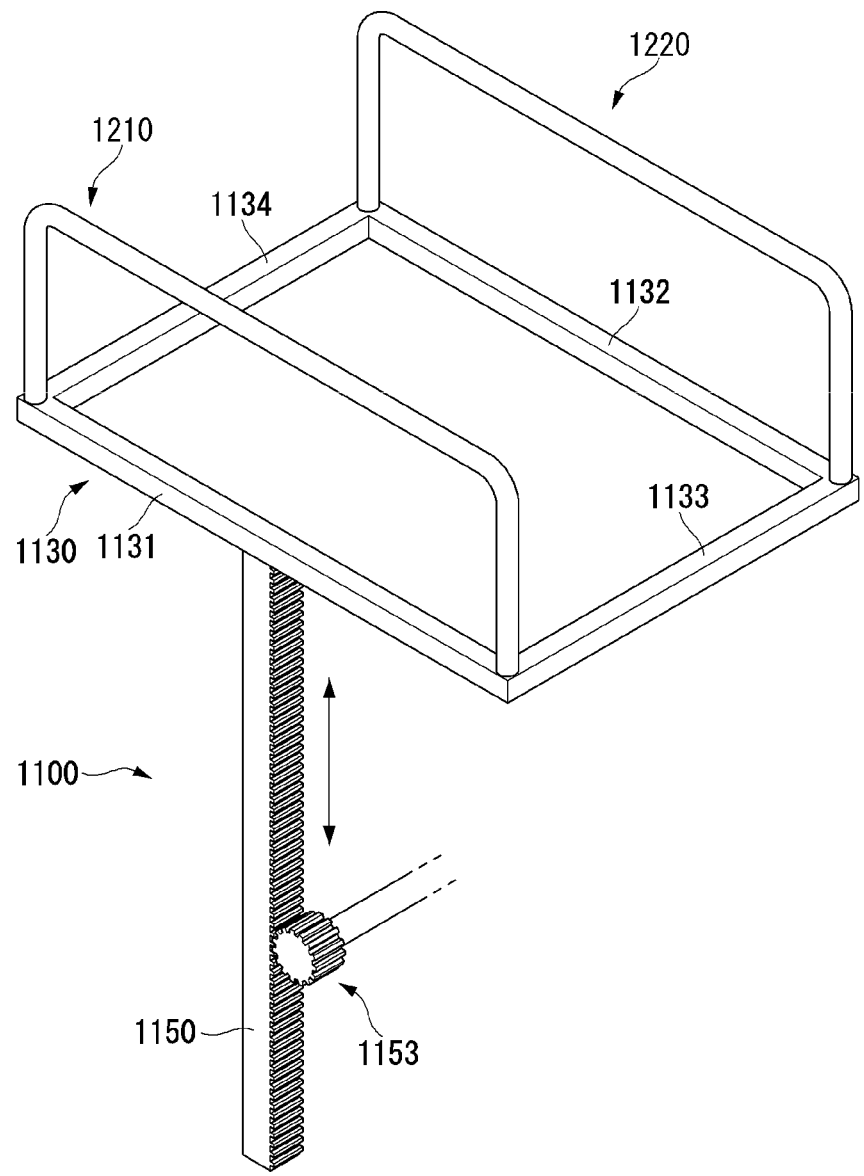

[FIG. 13]
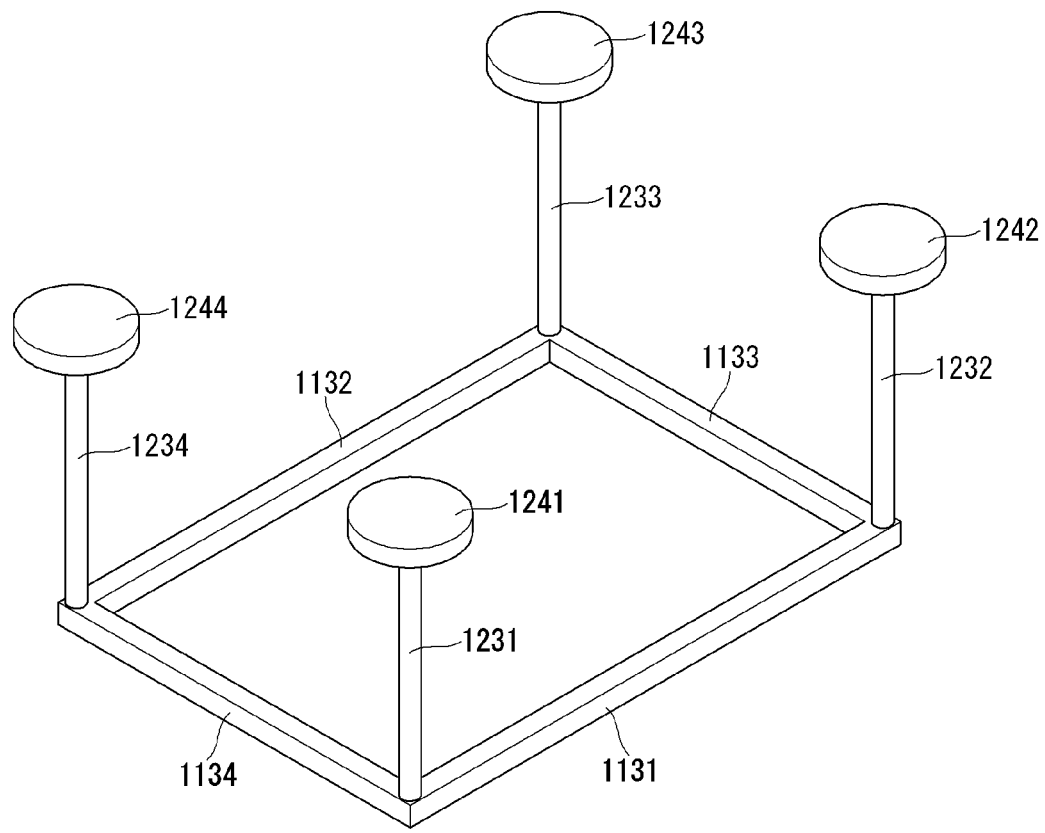

[FIG. 14]
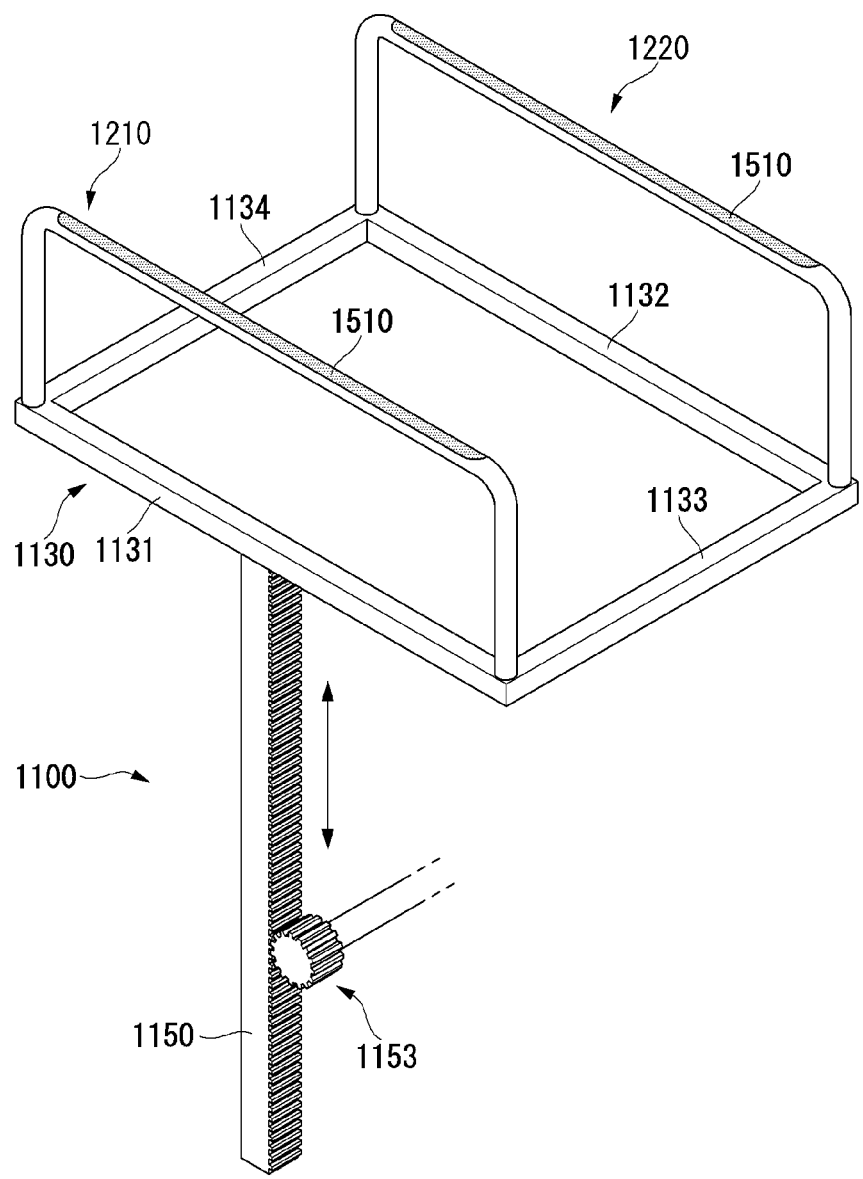

[FIG. 15]
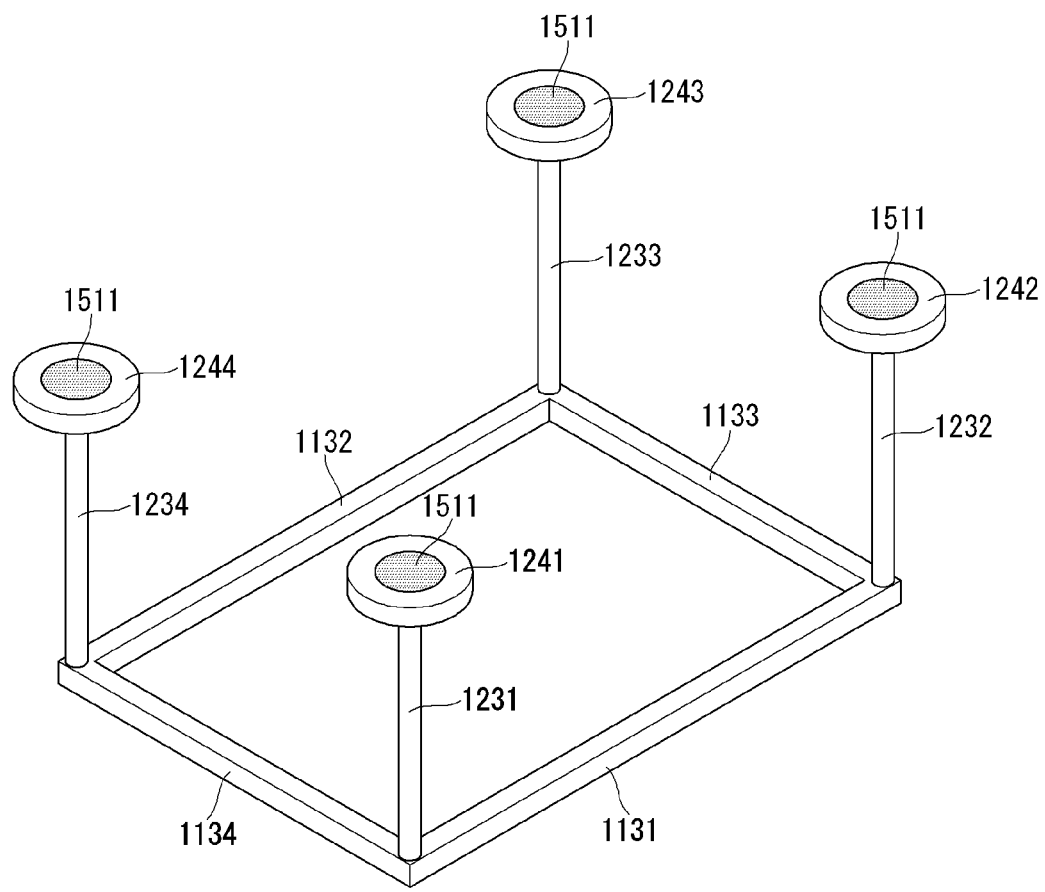

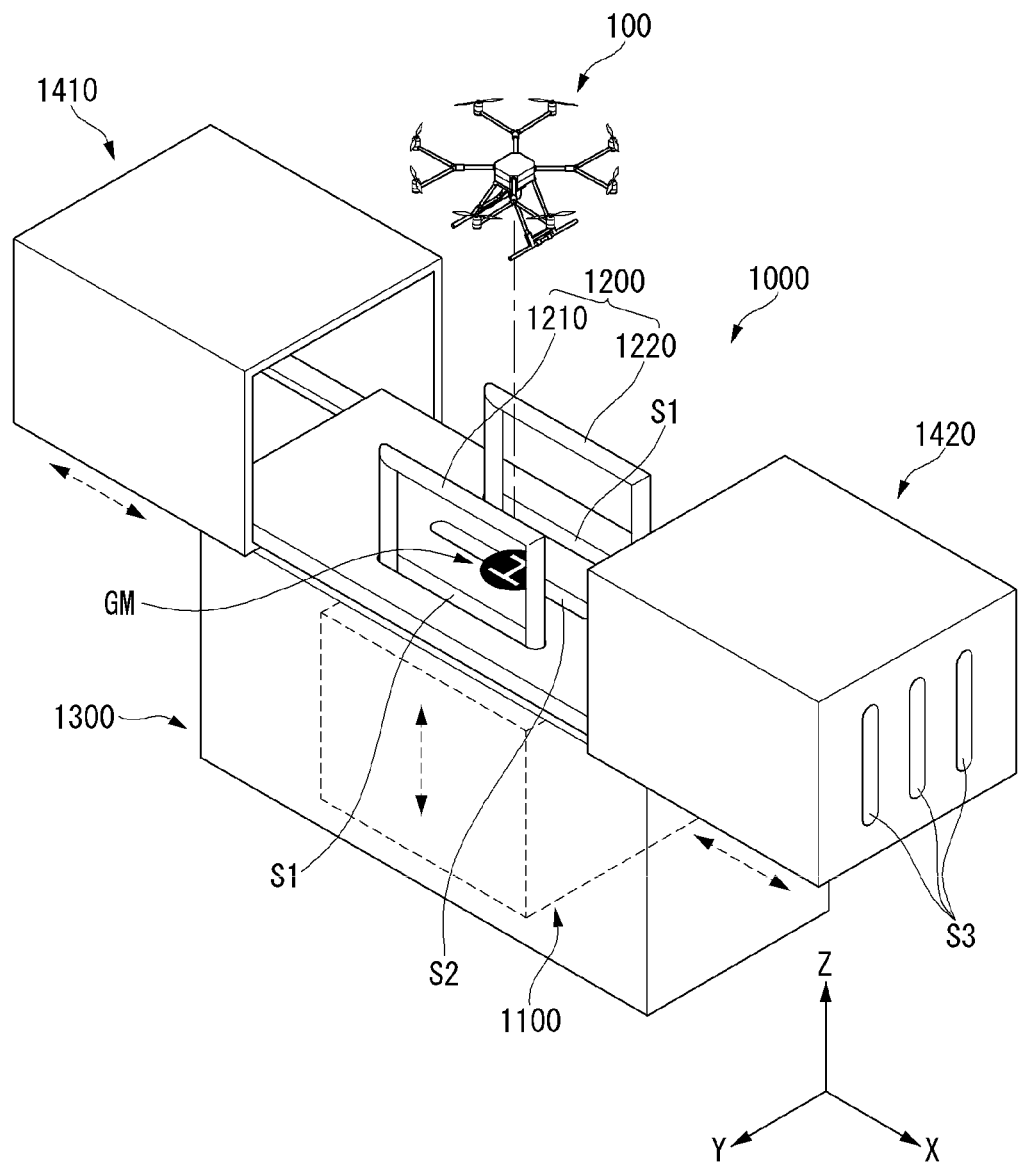
[FIG. 16]

STATION FOR UNMANNED AERIAL ROBOT

CROSS-REFERENCE TO RELATED APPLICATIONS

The present application claims the priority benefit of Korean Patent Application No. 10-2019-0100039, filed in the Republic of Korea on Aug. 16, 2019, the contents of which are all hereby incorporated by reference into the present application for all purposes as fully set forth herein.

BACKGROUND OF THE DISCLOSURE

Field of the Disclosure

The present disclosure relates to a station for an unmanned aerial robot, and more particularly, to a station for an unmanned aerial robot that can more accurately land an unmanned aerial robot and can reduce a size and weight of the unmanned aerial robot.

Related Art

An unmanned aerial robot is a general term for an airplane or helicopter-shaped unmanned aerial robot/uninhabited aerial vehicle (UAV) capable of flying and manipulating by induction of radio waves without a pilot. Recently, unmanned aerial robots have been increasingly used in various civilian and commercial fields, such as video shooting, unmanned home delivery service, and disaster monitoring, in addition to military uses, such as reconnaissance and attack.

The unmanned aerial robot cannot fly for a long time due to a small battery capacity. Therefore, it is common to store the unmanned aerial robot in a station and move the unmanned aerial robot while stored in the station outside a flying area. In addition, the unmanned aerial robot that has completed the flight will land at the station.

While the unmanned aerial robot lands at the station, an air current is generated by the unmanned aerial robot descending, so the unmanned vehicle is subjected to an external force due to the air current. Therefore, it is difficult to control the landing of the unmanned aerial robot, and the unmanned aerial robot lands at a location separated from the desired landing point. Therefore, the station should be formed in size considering the landing error range of the unmanned aerial robot. That is, the station should be substantially larger in size than the space in which the unmanned aerial robot is mounted.

SUMMARY OF THE DISCLOSURE

The present disclosure aims to solve the above problems.

In addition, the present disclosure is to provide a station capable of reducing a landing error range of an unmanned aerial robot.

In addition, the present disclosure is to provide a station capable of preventing an unmanned aerial robot from colliding with the station while the unmanned aerial robot lands.

In addition, the present disclosure is to provide a station for an unmanned aerial robot which can be reduced in size.

In an aspect, a station (e.g. system) for an unmanned aerial robot can include a control box configured to have a landing surface formed with a guide mark which guides a landing point of the unmanned aerial robot, a lifter (elevator) configured to be disposed in the control box and movable vertically, and a landing zone configured to be coupled to the lifter and have a height of a highest point located at least above the landing surface during vertical movement.

The landing zone can be in a state in which a height of a lowest point during the vertical movement is equal to or lower than the landing surface.

The lifter can include: a frame configured to be coupled to the landing zone; a first support configured to have a first end horizontally move within the control and a second end rotatably fastened by a predetermined radius at one point of the frame; and a second support configured to have a first end within the control box and a second end movably fastened on one surface of the frame, and the first support and the second support can be connected in an X shape by a rotatable hinge and have heights of the first and second supports varying according to a horizontal movement of the first support.

The lifter can include: a pinion configured to rotate by (i.e., be rotated by) a motor; and a rack configured to horizontally move according to (i.e., by) the rotation movement of the pinion, and the end of the first support can be fixed to the rack.

The lifter can include: a vertical rack configured to be fixed to the frame and vertically disposed; and a pinion configured to rotate by a motor and vertically move the vertical rack according to the rotation movement.

The landing zone can include: a vertical support configured to be spaced apart from the frame by a predetermined interval and vertically disposed; and a horizontal bar configured to extend to be bent on the vertical frame.

At least some area of the horizontal bar can have a magnetic body.

The landing zone can include: a vertical support configured to be spaced apart from the frame by a predetermined interval and vertically disposed; and a horizontal plate configured to have a predetermined width at an end of the vertical frame.

At least some area of the horizontal bar can have a magnetic body.

The landing surface can further include: a first slot configured to correspond to a path through the landing zone moves; and a second slot configured to be disposed adjacent to the first slot.

The station can further include: a cover portion configured to cover the unmanned aerial robot seated on the landing surface.

At least one surface of side surfaces of the cover can be formed with at least one slot.

The station can further include: a driving module configured to perform an operation of moving the lifter up and down and opening and closing of the cover portion; a communication module configured to communicate with the unmanned aerial robot; and a control module configured to control the driving device to move the lifter up while turning off the cover portion so that the landing surface is exposed when access information of the unmanned aerial robot is provided from the communicator.

When the unmanned aerial robot lands in the landing zone, the control module can control the driving device to move the lifter down.

The landing zone can include a pressure sensor, and the control module can determine whether the unmanned aerial robot lands based on a sensing result of the pressure sensor.

The station can further include: an image acquirer configure to acquire images around the landing zone, in which the control module can determine whether the unmanned aerial robot lands based on the image acquired by the image acquirer.

BRIEF DESCRIPTION OF THE DRAWINGS

FIG. 1 is a perspective view illustrating an unmanned aerial robot according to an embodiment of the present disclosure.

FIG. 2 is a block diagram illustrating a control relationship between main components of the unmanned aerial robot of FIG. 1.

FIG. 3 is a block diagram illustrating a control relationship between major components of an aviation control system according to an embodiment of the present disclosure.

FIG. 4 is a diagram illustrating a configuration of a station for an unmanned aerial robot according to an embodiment of the present disclosure.

FIG. 5 is a perspective view of the station for an unmanned aerial robot according to an embodiment of the present disclosure.

FIG. 6 is a front view of the station for an unmanned aerial robot according to an embodiment of the present disclosure.

FIG. 7 is a side view of the station for an unmanned aerial robot according to an embodiment of the present disclosure.

FIG. 8 is a diagram illustrating an embodiment of an elevator of the station for an unmanned aerial robot according to an embodiment of the present disclosure.

FIG. 9 is a flowchart illustrating an operation of the station for an unmanned aerial robot according to the embodiment of the present disclosure.

FIG. 10 is a diagram illustrating an operation of the station according to an embodiment of the present disclosure.

FIG. 11 is a diagram illustrating the operation of the station when the unmanned aerial robot lands on the landing stand according to an embodiment of the present disclosure.

FIG. 12 is a diagram illustrating an elevator according to another embodiment in the present disclosure.

FIG. 13 is a diagram illustrating a landing stand according to another embodiment of the present disclosure.

FIG. 14 is a diagram illustrating a landing stand according to an embodiment of the present disclosure.

FIG. 15 is a diagram illustrating a landing stand including four vertical supports according to an embodiment of the present disclosure.

FIG. 16 is a diagram illustrating a station according to an embodiment of the present disclosure.

DESCRIPTION OF EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., can be used to describe various components, such components must not be limited by the above terms. The above terms are used only to distinguish one component from another.

When an element is "coupled" or "connected" to another element, it should be understood that a third element can be present between the two elements although the element can be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

The present invention may include 5G generation (5th generation mobile communication) required by an apparatus and/or an AI processor that requires AI processed information.

FIG. 1 shows a perspective view of an unmanned aerial robot according to an embodiment of the present invention.

First, the unmanned aerial robot 100 is manually manipulated by an administrator on the ground, or it flies in an unmanned manner while it is automatically piloted by a configured flight program. The unmanned aerial robot 100, as in FIG. 1, includes a main body 20, a horizontal and vertical movement propulsion device 10, and landing legs 30.

The main body 20 is a body portion on which a module, such as a task unit 40, is mounted.

The horizontal and vertical movement propulsion device 10 includes one or more propellers 11 positioned vertically to the main body 20. The horizontal and vertical movement propulsion device 10 according to an embodiment of the present invention includes a plurality of propellers 11 and motors 12, which are spaced apart. In this case, the horizontal and vertical movement propulsion device 10 can have an air jet propeller structure not (as a replacement for) the propeller 11, or may be any other propulsion device.

A plurality of propeller supports is radially formed in the main body 20. The motor 12 can be mounted on each of the propeller supports. The propeller 11 is mounted on each motor 12.

The plurality of propellers 11 can be disposed symmetrically with respect to the main body 20. Furthermore, the rotation direction of the motor 12 can be determined so that the clockwise and counterclockwise rotation directions of the plurality of propellers 11 are combined. The rotation direction of one pair of the propellers 11 symmetrical with respect to the main body 20 can be set identically (e.g., clockwise). Furthermore, the other pair of the propellers 11 can have a rotation direction opposite (e.g., counterclockwise) that of the one pair of the propellers 11.

The landing legs 30 are disposed with being spaced apart at the bottom of the main body 20. Furthermore, a buffering support member for minimizing an impact attributable to a collision with the ground when the unmanned aerial robot 100 makes a landing can be mounted on the bottom of the landing leg 30. The unmanned aerial robot 100 can have various aerial vehicle structures different from that described above.

FIG. 2 is a block diagram showing a control relation between major elements of the unmanned aerial robot of FIG. 1.

Referring to FIG. 2, the unmanned aerial robot 100 measures its own flight state using a variety of types of sensors in order to fly stably. The unmanned aerial robot 100 can include a sensing module 130 including at least one sensor.

The flight state of the unmanned aerial robot 100 is defined as rotational states and translational states.

The rotational states mean "yaw", "pitch", and "roll." The translational states mean longitude, latitude, altitude, and velocity.

In this case, "roll", "pitch", and "yaw" are called Euler angle(s), and indicate that the x, y, z three axes of an aircraft body frame coordinate have been rotated with respect to a given specific coordinate, for example, three axes of NED coordinates N, E, D. If the front of an aircraft is rotated left and right on the basis of the z axis of a body frame coordinate, the x axis of the body frame coordinate has an angle difference with the N axis of the NED coordinate, and this angle is called "yaw" ($\Psi$). If the front of an aircraft is rotated up and down on the basis of the y axis toward the right, the z axis of the body frame coordinate has an angle difference with the D axis of the NED coordinates, and this angle is called a "pitch" ($\theta$). If the body frame of an aircraft is inclined left and right on the basis of the x axis toward the front, the y axis of the body frame coordinate has an angle to the E axis of the NED coordinates, and this angle is called "roll" ($\Phi$).

The unmanned aerial robot 100 uses 3-axis gyroscopes, 3-axis accelerometers, and/or 3-axis magnetometers in order to measure the rotational states, and uses a GPS sensor and/or a barometric pressure sensor in order to measure the translational states.

The sensing module 130 of the present invention includes at least one of the gyroscopes, the accelerometers, the GPS sensor, the image sensor and the barometric pressure sensor. In this case, the gyroscopes and the accelerometers measure the states in which the body frame coordinates of the unmanned aerial robot 100 have been rotated and accelerated with respect to earth centered inertial coordinate. The gyroscopes and the accelerometers can be fabricated as a single chip called an inertial measurement module (IMU) constructed using a micro-electro-mechanical systems (MEMS) semiconductor process technology. Furthermore, the IMU chip can include a microcontroller for converting measurement values based on the earth centered inertial coordinates, measured by the gyroscopes and the accelerometers, into local coordinates, for example, north-east-down (NED) coordinates used by GPSs.

The gyroscopes measure angular velocity at which the body frame coordinate x, y, z three axes of the unmanned aerial robot 100 rotate with respect to the earth centered inertial coordinates, calculate values (Wx.gyro, Wy.gyro, Wz.gyro) converted into fixed coordinates, and convert the values into Euler angles ($\Phi$gyro, $\theta$gyro, $\Psi$gyro) using a linear differential equation.

The accelerometers measure acceleration for the earth centered inertial coordinates of the body frame coordinate x, y, z three axes of the unmanned aerial robot 100, calculate values (fx,acc, fy,acc, fz,acc) converted into fixed coordinates, and convert the values into "roll ($\Phi$acc)" and "pitch ($\theta$acc)." The values are used to remove a bias error included in "roll ($\Phi$gyro)" and "pitch ($\theta$gyro)" using measurement values of the gyroscopes.

The magnetometers measure the direction of magnetic north points of the body frame coordinate x, y, z three axes of the unmanned aerial robot 100, and calculate a "yaw" value for the NED coordinates of body frame coordinates using the value.

The GPS sensor calculates the translational states of the unmanned aerial robot 100 on the NED coordinates, that is, a latitude (Pn.GPS), a longitude (Pe.GPS), an altitude (hMSL.GPS), velocity (Vn.GPS) on the latitude, velocity (Ve.GPS) on longitude, and velocity (Vd.GPS) on the altitude, using signals received from GPS satellites. In this case, the subscript MSL means a mean sea level (MSL).

The barometric pressure sensor can measure the altitude (hALP.baro) of the unmanned aerial robot 100. In this case, the subscript ALP means an air-level pressure. The barometric pressure sensor calculates a current altitude from a take-off point by comparing an air-level pressure when the unmanned aerial robot 100 takes off with an air-level pressure at a current flight altitude.

The camera sensor can include an image sensor (e.g., CMOS image sensor), including at least one optical lens and multiple photodiodes (e.g., pixels) on which an image is focused by light passing through the optical lens, and a digital signal processor (DSP) configuring an image based on signals output by the photodiodes. The DSP can generate a moving image including frames configured with a still image, in addition to a still image.

The unmanned aerial robot 100 includes a communication module 170 for inputting or receiving information or outputting or transmitting information. The communication module 170 can include a drone RF (radio frequency) module 175 for transmitting/receiving information to/from a different external device. The communication module 170 can include an input module 171 for inputting information. The communication module 170 can include an output module 173 for outputting information. The output module 173 can be omitted from the unmanned aerial robot 100, and can be formed in a terminal 300.

For example, the unmanned aerial robot 100 can directly receive information from the input module 171. For another example, the unmanned aerial robot 100 can receive information, input to a separate terminal 300 or server 200, through the drone RF module 175.

For example, the unmanned aerial robot 100 can directly output information to the output module 173. For another example, the unmanned aerial robot 100 can transmit information to a separate terminal 300 through the drone RF module 175 so that the terminal 300 outputs the information.

The drone RF module 175 can be provided to communicate with an external server 200, an external terminal 300, etc. The drone RF module 175 can receive information input from the terminal 300, such as a smartphone, a computer or the like. The drone RF module 175 can transmit information to be transmitted to the terminal 300. The terminal 300 can output information received from the drone RF module 175.

The drone RF module 175 can receive various command signals from the terminal 300 or/and the server 200. The drone RF module 175 can receive area information for driving, a driving route, or a driving command from the terminal 300 or/and the server 200. In this case, the area information can include flight restriction area (A) information and approach restriction distance information.

The input module 171 can receive On/Off or various commands. The input module 171 can receive area information. The input module 171 can receive object information. The input module 171 can include various buttons or a touch pad or a microphone.

The output module 173 can notify a user of various pieces of information. The output module 173 can include a speaker and/or a display. The output module 173 can output information on a discovery detected while driving. The output module 173 can output identification information of a discovery. The output module 173 can output location information of a discovery.

The unmanned aerial robot 100 includes a processor 140 for processing and determining various pieces of information, such as mapping and/or a current location. The processor 140 can control an overall operation of the unmanned aerial robot 100 through control of various elements that configure the unmanned aerial robot 100.

The processor 140 can receive information from the communication module 170 and process the information. The processor 140 can receive information from the input module 171, and can process the information. The processor 140 can receive information from the drone RF module 175, and can process the information. The processor 140 can receive sensing information from the sensing module 130, and can process the sensing information.

The processor 140 can control the driving of the motor 12. The processor 140 can control the operation of the task module 40.

The unmanned aerial robot 100 includes a storage (i.e., memory, a non-transitory computer readable medium) 150 for storing various data. The storage 150 records various pieces of information necessary for control of the unmanned aerial robot 100, and can include a volatile or non-volatile recording medium, such as random access memory (RAM) or the like.

A map for a driving area can be stored in the storage 150. The map can have been input by the external terminal 300 capable of exchanging information with the unmanned aerial robot 100 through the drone RF module 175, or can have been autonomously learnt and generated by the unmanned aerial robot 100. In the former case, the external terminal 300 can include a remote controller, a PDA, a laptop, a smartphone or a tablet on which an application for a map configuration has been mounted, for example.

Referring to FIG. 3, the aerial control system according to an embodiment of the present invention can include the unmanned aerial robot 100 and the server 200, or can include the unmanned aerial robot 100, the terminal 300, and the server 200. The unmanned aerial robot 100, the terminal 300, and the server 200 are interconnected using a wireless communication method.

Global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc., can be used as the wireless communication method, but is not limited thereto.

A wireless Internet technology can be used as the wireless communication method. The wireless Internet technology includes a wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and 5G for example. In particular, a faster response is possible by transmitting/receiving data using a 5G communication network.

The terminal 300 can include a controller for receiving a control command for controlling the unmanned aerial robot 100 and an output unit for outputting visual or audio information.

The server 200 stores (for example, in memory) the information of the restricted flight area A, in which the flight of the unmanned flight robot 100 is restricted, and approaches the restricted flight area A according to the autonomous driving level of the unmanned flight robot 100. The limitation distance is calculated differently, and flight restriction area A information and access restriction distance information are provided to at least one of the unmanned aerial robot 100 and the terminal 300. Therefore, in the case of the unmanned aerial robot 100 having a high level for free driving, the unmanned aerial robot 100 having a low autonomous driving level is restricted in flight in the case of the unmanned aerial robot 100 having a low autonomous driving level. There is an advantage to prevent accidents that can occur in close proximity to zone A.

In addition, the server 200 sets a flight path based on the flight restriction area (A) information and the access restriction distance information, and provides the flight path to at least one of the unmanned flight robot 100 and the terminal 300 can do.

The server 200 can set a flight path based on the flight restriction area (A) information and the access restriction distance information according to the autonomous driving level, and control the unmanned flight robot 100 according to the flight path have.

When the unmanned aerial robot 100 approaches within the access restriction distance, the server 200 can transmit a different command to the unmanned aerial robot 100 according to the autonomous driving level. The server 200 can transmit different commands to the unmanned aerial robot 100 whether the unmanned aerial robot 100 is automatically adjusted or manually adjusted.

For example, the server 200 can determine the autonomous driving level of the communication unit and the unmanned aerial robot 100 that exchange information with the unmanned aerial robot 100 and/or the terminal 300), Providing the information to the storage 230 and the unmanned aerial robot 100 or/and the terminal 300 for storing the flight restriction area (A) information is restricted flight of the unmanned aerial robot 100, or unmanned flight The robot 100 or/and the terminal 300 can include a processor 240 for controlling. In addition, the sub can further include a location determination module 250 that determines the position and altitude of the unmanned aerial robot 100 based on the position altitude information provided by the unmanned aerial robot 100.

The storage 230 stores information on the flight restricted area A for air control, stores information on the autonomous driving level of the unmanned aerial robot 100, and stores the information on the autonomous driving level of the unmanned aerial robot 100. Information about air traffic control can be stored.

The level determining module 220 determines the autonomous driving level of the unmanned aerial robot 100. The autonomous driving level of the unmanned aerial robot 100 is determined based on the autonomous driving level information transmitted from the unmanned aerial robot 100 to the server 200, or is determined by the autonomous driving level information provided from the terminal 300.

The autonomous driving level of the unmanned aerial robot 100 is defined as level 1 as a level capable of fully manual driving only or that assists manual driving with various sensors, and the unmanned aerial robot 100 runs semi-autonomous (automatic landing and landing), level 2 involves passive obstacle avoidance, using a user-specified path, and level 3 involves the unmanned aerial robot 100 driving fully autonomously (generally generates a path and moves to the destination) and performs a task on its own (i.e., not a user-specified task).

The processor 240 calculates a different access restriction distance of the restricted flight area A according to the autonomous driving level of the unmanned aerial robot 100, and controls the unmanned aerial robot 100 and/or the terminal 300. It provides flight restricted area (A) information and access restriction distance information.

The information of the restricted flight area A can include location information of the restricted flight area A and boundary information of the restricted flight area A.

Here, providing the information of the processor 240 to the unmanned aerial robot 100 and/or the terminal 300 includes the unmanned aerial robot 100 and/or the terminal 300 to providing the information data in a wireless communication method, such as 5G.

Station for Unmanned Aerial Robot

FIG. 4 is a block diagram illustrating a configuration of a station for an unmanned aerial robot according to an embodiment of the present disclosure. FIGS. 5 to 7 are diagrams illustrating the station for an unmanned aerial robot according to the embodiment of the present disclosure. FIG. 5 is a perspective view of the station for an unmanned aerial robot according to the embodiment of the present disclosure, FIG. 6 is a front view of the station for an unmanned aerial robot, and FIG. 7 is a side view of the station for an unmanned aerial robot. FIG. 8 is a diagram illustrating an embodiment of an elevator of the station for an unmanned aerial robot. Hereinafter, in the present specification, a horizontal plane refers to an xy plane parallel to a landing surface LP of a control box, and a vertical direction refers to a z-axis direction perpendicular to the horizontal plane. The upper and lower parts refer to a relative height on a z-axis, in which a high-axial z-axis direction with respect to the horizontal plane is referred to as an upper direction and an opposite direction thereto refers to a lower direction.

Referring to FIGS. 4 to 8, the station for an unmanned aerial robot (hereinafter, referred to as a station) 1000 according to the embodiment of the present disclosure includes a control box 1300, a sensing module 1390, an elevator (i.e., lifter) 1100, and a landing stand 1200, and cover portions 1410 and 1420. The control box 1300 can be in the form of a box having an internal space and has a landing surface LP on which the unmanned aerial robot 100 lands. The control box 1300 includes a control module 1310, a drive module 1320, and a communication module 1330.

The control module 1310 generates a control signal that controls the driving module 1320. The driving module 1320 performs mechanical driving belonging to the station 1000, and includes, for example, the cover portions 1410 and 1420, a motor that drives the elevator 1100, and the like. The communication module 1330 can communicate with a drone module (i.e., communicator) 175 of the unmanned aerial robot 100 or a server, and can determine a flight state, a landing plan or the like of the unmanned aerial robot 100 through the communication. In addition, an internal space of the control box 1300 can include a configuration for wirelessly charging the unmanned aerial robot 100. In addition, the elevator (i.e., lifter) 1100 to be described later can be mounted in the internal space of the control box 1300.

One surface of the control box 1300 can be formed as the landing surface LP. FIGS. 4 to 6 illustrate an embodiment in which the landing surface LP is formed outside an upper surface of the control box 1300.

The landing surface LP includes a guide mark GM guiding the landing point of the unmanned aerial robot 100. The landing surface LP corresponds to a location where the unmanned aerial robot 100 is finally seated. In the embodiment of the present disclosure, the unmanned aerial robot 100 lands on the landing stand 1200, which will be described later, and the landing stand 1200 vertically descends to seat the unmanned aerial robot 100 on the landing surface LP. In some embodiments, the unmanned aerial robot 100 may not directly contact the landing surface LP.

A slot S1 can be formed in an area adjacent to the guide mark GM on the landing surface LP to provide a path through which the elevator 1100 vertically moves the landing surface LP. The slot S1 can be located in the area of the guide mark GM.

The elevator 1100 vertically moves in the control box 1300, so the landing stand 1200 located above the elevator 1100 can move vertically.

The landing stand 1200 is located above the elevator 1100, and the landing stand 1200 according to an embodiment can be implemented in the form of a pair of bars.

The cover portions 1410 and 1420 are structures that cover an upper area of the control box 1300 and include first and second covers 1410 and 1420 that are opened and closed in a sliding form. The first cover 1410 and the second cover 1420 slide to be spaced apart from each other to open the upper area of the control box 1300 in order to expose the landing surface LP. When the unmanned aerial robot 100 lands on the landing surface LP, the first and second covers 1410 and 1420 slide to contact each other in order to close the upper area of the control box 1300.

FIG. 8 is a diagram illustrating the embodiment of the elevator and the landing stand.

Referring to FIG. 8, an elevator 1100 according the first embodiment includes a first support 1100, a second support 1120, a rack 1141, a pinion 1142, and a frame 1130.

The first support 1100 and the second support 1120 are fastened by a first hinge h1 and may have an X shape. The first support 1100 and the second support 1120 can rotate in a predetermined radius about the first hinge h1.

A first end 1111 of the first support 1100 is connected to the rack 1141 by a second hinge h2, and a second end 1112 of the first support 1100 is connected to the frame 1130 by a third hinge h3. The first end 1111 of the first support 1100 can rotate in a predetermined radius about the second hinge h2 according to the horizontal movement of the rack 1141. As the first end 1111 of the first support 1100 moves horizontally, the second end 1112 of the first support 1100 moves vertically while moving horizontally in an opposite direction to the first end 1111.

The first end 1121 of the second support 1120 is fixed in the control box 1300 to a flange 132 of the control box 1300 via a hinge h5, and the second end 1122 of the second support 1120 is connected to a roller R1. The roller R1 is fastened to move horizontally on a lower surface of the frame 1130. For example, in the drawings, the roller R1 can be fastened to the frame 1130 in a form of being inserted into a groove formed on the lower surface of the frame 1130, or the roller R1 may only contact a bottom surface of the frame.

The rack 1141 is located on the bottom surface of the control box 1300 and is fastened to the pinion 1142. The pinion 1142 is a gear that rotates on teeth of the rack 1141 to engage the rack 1141. The pinion 1142 rotates by a motor, and the rack 1141 horizontally moves according to a rotation movement of the pinion 1142.

As the rack 1141 moves horizontally, the first end 1111 of the first support 1100 moves horizontally, and a length of a vertical component of the first support 1100 varies.

In addition, when the first support 1100 moves horizontally, the second end 1122 of the second support 1120 moves horizontally along the lower surface of the frame 1130 by the roller R1.

The frame 1130 includes first, second, third and fourth frame bars 1131, 1132, 1133 and 1134. Ends of the first to fourth frame bars 1131 to 1134 can be connected to each other to form a frame.

The elevator 1100 is connected to the first frame bar 1131. The second end 1112 of the first support bar 1100 is connected to one end of the first frame bar 1131 via the hinge h3, and the other end of the first frame bar 1131 is fastened to (or engages) the roller R1 connected to the second end 1122 of the second support 1120.

Although the drawings illustrate the embodiment in which the elevator 1100 is connected only to the first frame bar 1131, the elevator 1100 can be connected to the elevator having the same structure as the second frame bar 1132.

The landing stand 1200 includes a first landing stand 1210 and a second landing stand 1220. The first landing stand 1210 can include a first vertical supports 1211 spaced apart (or extending) from the each other by a predetermined interval and connected to the first frame bar 1131 (or being spaced apart from the first frame bar 1131), and a first horizontal bar 1212 which extends to be bent in a horizontal direction from the first vertical support 1211 and is spaced apart from the first frame bar 1131 by a predetermined distance. The first vertical support 1211 and the first horizontal bar 1212 can be integrally formed, and may be an iron rod.

The second landing stand 1220 can include a second vertical support 1221 and a second horizontal bar 1222 having the same structure as the first landing stand 1210.

FIG. 9 is a flowchart illustrating the operation of the station according to the embodiment of the present disclosure.

The operation of the station will be described with reference to FIG. 9.

In a first step S910, the station 1000 detects the approach of the unmanned aerial robot 100.

The station 1000 can communicate with the drone communicator 175 of the unmanned aerial robot 100 or the communicator 210 of the server 200 through the communication module 1330. The station 1000 can determine whether the unmanned aerial robot 100 lands or approaches through the communication with the unmanned aerial robot 100 or the server 200.

In a second step S920, when the unmanned aerial robot 100 approaches the station 1000 for landing, the control module 1310 of the station 1000 drives the driving module 1320. That is, the driving module 1320 opens the cover portions 1410 and 1420 and moves the elevator 1100 up. For example, the driving module 1320 can move the elevator 1100 up by rotating the motor to move the rack 1141 or the vertical rack 1150.

FIG. 10 is a diagram illustrating an operation of a station in a second step S920.

Referring to FIG. 10, in order to seat the unmanned aerial robot 100 on the landing stand 1200, the first and second cover portions 1410 and 1420 are open to expose the landing stand 1200 and the guide mark GM.

The elevator 1100 ascends to the highest height within a vertically movable range.

The unmanned aerial robot 100 descends based on the guide mark GM and lands on the landing stand 1200 during the descending.

Because the elevator 1100 ascends to a highest height, the unmanned aerial robot 100 lands on the landing stand 1200 at a point where the unmanned aerial robot 100 is less affected by a descending air current that occurs at the lower part of the unmanned aerial robot 100.

As a result, the unmanned aerial robot 100 can land in a more accurate location than directly landing on the landing surface LP. Therefore, it is possible to prevent a collision between the unmanned aerial robot 100 and the station for an unmanned aerial robot 1000 while the unmanned aerial robot 100 lands, and reduce the overall size and weight of the station for an unmanned aerial robot 1000.

In a third step S930, as illustrated in FIG. 9, the station 1000 determines whether the unmanned aerial robot 100 completely lands. In order to determine whether the unmanned aerial robot 100 lands, the station 1000 can use the sensing module 1390. For example, the sensing module 1390 includes a pressure sensor connected to the landing stand 1200, and the control module 1310 can determine whether the unmanned aerial robot 100 lands based on the sensing result of the pressure sensor. Alternatively, the sensing module 1390 can acquire an image around the landing stand 1200 using a camera or the like, and the control module 1310 can read (i.e., analyze) the image to determine whether the unmanned aerial robot 100 lands.

In a fourth step S940, as illustrated in FIG. 9, when the unmanned aerial robot 100 lands, the control module 1310 of the station 1000 drives the driving module 1320 to close the cover portions 1410 and 1420 and move the elevator 1100 down.

FIG. 11 is a diagram illustrating the operation of the station 1000 when the unmanned aerial robot 100 lands on the landing stand 1200. Referring to FIG. 11, when the unmanned aerial robot 100 is seated on the landing stand 1200, the elevator 1100 descends. The elevator 1100 can descend until the landing stand 1200 is located at the same location as the landing surface LP or a lower location than the landing surface LP. In addition, the first and second covers 1410 and 1420 slide to cover the unmanned aerial robot 100 seated on the landing surface LP.

FIG. 12 is a diagram illustrating an elevator according to another embodiment in the present disclosure.

Referring to FIG. 12, an elevator 1100 according to an embodiment includes a pinion 1153 and a vertical rack 1150 extending in a vertical direction.

The pinion 1153 is coupled to a motor and rotates by the motor. The pinion 1153 can be connected to the motor and fixed at a specific location.

One end of the vertical rack 1150 is fixed to a first frame bar 1131, and the other end of the vertical rack 1150 is disposed to be vertically moved (i.e., movable in the vertical direction) in the control box 1300. The vertical rack 1150 can be arranged to be inserted into a structure in which a hole is formed to enable vertical movement.

Although FIG. 12 illustrates an embodiment in which the elevator 1100 is connected only to the first frame bar 1131, the elevator 1100 can be additionally connected to at least any one of the second, third and fourth frame bars 1132, 1133 and 1134.

FIG. 13 is a diagram illustrating a landing stand according to another embodiment of the present disclosure.

Referring to FIG. 13, the landing stand according to an embodiment of the present disclosure includes first, second, third and fourth frame bars 1131, 1132, 1133 and 1134, first, second, third and fourth vertical supports 1231, 1232, 1233 and 1234 extending from the first, second, third and fourth frame bars 1131, 1132, 1133 and 1134, and first, second, third and fourth horizontal bars 1241, 1242, 1243 and 1244 extending from the vertical supports 1231, 1232, 1233 and 1234. The first to fourth vertical supports 1231, 1232, 1233 and 1234 are spaced apart from each other by a predetermined interval, and are connected to a frame including the first, second, third and fourth frame bars 1131, 1132, 1133 and 1134. For example, the first, second, third and fourth vertical supports 1231, 1232, 1233 and 1234 can be connected at four corners of the frame 1130, respectively.

The first, second, third and fourth horizontal bars 1241, 1242, 1243 and 1244 can each have a plate shape (including a circular plate shape) having a predetermined width, and can be connected to the first, second, third and fourth vertical supports 1231, 1232, 1233 and 1234. For example, the first horizontal bar 1241 can be connected to the first vertical support 1231.

The first, second, third and fourth horizontal bars 1241, 1242, 1243 and 1244 provide a space in which the unmanned aerial robot 100 first lands. For example, a landing leg 30 of the unmanned aerial robot 100 can be seated on (each or any of) the first, second, third and fourth horizontal bars 1241, 1242, 1243 and 1244.

In addition, the landing stand implemented in the form of the first, second, third and fourth horizontal bars 1241, 1242, 1243 and 1244 can seat the unmanned aerial robot 100 regardless of the shape of the landing leg. The landing leg 30 of the unmanned aerial robot 100 can be implemented in various forms in addition to the embodiment illustrated in FIG. 1, and in some cases, can have a structure that is difficult to be seated in a bar-shaped landing stand. The landing stand according to the embodiment illustrated in FIG. 13 is connected to a vertical support formed at locations where the first, second, third and fourth horizontal bars 1241, 1242, 1243 and 1244 are spaced apart from each other, and therefore can correspond to the landing leg shapes of various unmanned aerial robots 100, and in some cases, the body of the unmanned aerial robot 100 without the landing leg can be seated on the landing stand.

FIGS. 14 and 15 are diagrams illustrating a landing stand according to another embodiment of the present disclosure.

Referring to FIG. 14, the landing stand includes a first landing stand 1210 and a second landing stand 1220. The first and second landing stands 1210 and 1220 can be formed in an rod shape (and may comprise iron and have an iron rod shape), as illustrated in FIGS. 8 and 11. The first and second landing stands 1210 and 1220 can include a magnetic body 1510 on a portion of a horizontal bar of the first and second landing stands 1210 and 1220. For example, the first and second landing stands 1210 and 1220 themselves can be made of a magnetic material, and an area in contact with the landing leg 30 of the unmanned aerial robot 100 can be made of magnetic material. Alternatively, a magnetic material can be inserted into the contact area of the unmanned aerial robot 100 with the landing leg 30.

Referring to FIG. 15, the landing stand can include the first, second, third and fourth vertical supports 1231, 1232, 1233 and 1234 spaced apart from each other, and first, second, third and fourth horizontal plates 1241, 1242, 1243 and 1244 formed at ends of the first, second, third and fourth vertical supports 1231, 1232, 1233 and 1234. The first, second, third and fourth horizontal plates 1241, 1242, 1243 and 1244 can include a magnetic body 1511, and the magnetic body 1511 may be provided at the center of the first, second, third and fourth horizontal plates 1241, 1242, 1243 and 1244.

As described above, the embodiments illustrated in FIGS. 13 and 14 include a magnetic material on the landing stand. Accordingly, the landing leg 30 of the unmanned aerial robot 100 made of a metallic material is more easily and accurately seated, thereby preventing the unmanned aerial robot 100 from colliding with other components of the station 1000.

FIG. 16 is a diagram illustrating a station according to an embodiment.

Referring to FIG. 16, the station 1000 includes a control box 1300, an elevator 1100, a landing stand 1200, and cover portions 1410 and 1420. In FIG. 16, the control box 1300, the elevator 1100, and the landing stand 1200 can be substantially the same as those of the above-described embodiments, and therefore detailed description thereof will be omitted.

Referring to FIG. 16, the landing surface LP of the control box 1300 can include a second slot formed around a guide mark GM in addition to a first slot S1 corresponding to a path through which the landing stand 1200 moves.

In addition, third slots S3 can be formed on one side of the cover portions 1410 and 1420.

The second slot S2 and the third slot S3 provide a path through which an air current that occurs when the unmanned aerial robot 100 descends can flow. Accordingly, the unmanned aerial robot 100 is less susceptible to ground effects caused by an air current that occurs when descending and can land at more accurate points.

The configuration described in the present specification is to be interpreted as being illustrative rather than being restrictive in all aspects. The scope of the present disclosure is to be determined by reasonable interpretation of the claims, and all modifications within an equivalent range of the present disclosure fall in the scope of the present disclosure.

According to the embodiment of the present disclosure, the unmanned aerial robot is subjected to less external force due to the air current at the bottom during landing by moving the landing stand up using the elevator, thereby reducing the landing error range.

In addition, according to the embodiment of the present disclosure, the unmanned aerial robot can land on the guide mark of the station more accurately, thereby preventing the collision with the station during the landing.

In addition, according to the embodiment of the present disclosure, since the unmanned aerial robot can land at the more accurate location of the station, the station can be formed in a smaller size.

What is claimed is:

1. A station for an unmanned aerial robot, the station comprising:
   a control box having a landing surface formed with a guide mark, the guide mark configured to guide a landing point of the unmanned aerial robot;
   an elevator disposed in the control box and configured to move along a vertical axis; and
   a landing stand coupled to the elevator and having a highest height located above a height of the landing surface of the control box.

2. The station of claim 1, wherein the landing stand is configured to move, via the elevator, to a lowest height that is equal to or lower than the height of the landing surface of the control box.

3. The station of claim 1, wherein the elevator includes:
a frame coupled to the landing stand;
a first support including:
a first end hingedly coupled to the control box; and
a second end having a roller engaging a first surface of the frame; and
a second support including:
a first end; and
a second end hingedly fastened to a second surface of the frame, the second surface of the frame being different than the first surface of the frame, and
wherein the first support and the second support are connected by a rotatable hinge to form an X-shape and the heights of the first support and the second support varies according to a horizontal position of the first support.

4. The station of claim 3, wherein the elevator further includes:
a pinion configured to be rotated by a motor; and
a rack being engaged by the pinion, rotation of the pinion causes the rack and the first end of the first support to move along a horizontal axis, the horizontal axis being perpendicular to the vertical axis, and
wherein the first end of the first support is hingedly fastened to the rack.

5. The station of claim 1, wherein the elevator includes:
a frame;
a vertical rack fixed to the frame and extending in along the vertical axis; and
a pinion configured to be rotated by a motor, rotation of the pinion causes the vertical rack to move along the vertical axis.

6. The station of claim 5, wherein the landing stand includes:
a first vertical support extending along the vertical axis;
a second vertical support extending along the vertical axis, the second vertical support being spaced apart by the first vertical support by a predetermined interval; and
a first horizontal bar connected to the first vertical support and to the second vertical support.

7. The station of claim 6, wherein a portion of the first horizontal bar includes a magnetic body.

8. The station of claim 6, wherein the landing stand further includes:
a third vertical support; and
a fourth vertical support,
each of the first vertical support, the second vertical, the third vertical support and the fourth vertical support being disposed on a respective corner of the frame.

9. The station of claim 8, wherein the landing stand further includes a second horizontal bar connected to the third vertical support and the fourth vertical support, and
wherein the second horizontal bar includes a magnetic body.

10. The station of claim 1, wherein the landing surface of the control box further includes:
a first slot; and
a second slot disposed adjacent to the first slot, and
wherein the landing stand is configured to move through the first slot and the second slot.

11. The station of claim 1, further comprising:
a first cover portion; and
a second cover portion, the first cover portion and the second cover portion configured to:
move towards each other along a horizontal axis to a closed position covering the unmanned aerial robot when the unmanned aerial robot is seated on the landing surface, and
move away from each other to an opened position,
wherein in the open position, the first cover portion is spaced apart from the second cover portion to allow the unmanned aerial robot to land on the landing stand.

12. The station of claim 11, wherein at least one surface of side surfaces of the first cover portion and the second cover portion is formed with at least one slot, and
wherein the at least one slot provides a path through which air current, generated when the unmanned aerial robot descends, can escape.

13. The station of claim 11, further comprising:
a driving device configured to move the elevator up and down and to move the first cover portion and the second cover portion between the opened position and the closed position;
a communication module configured to communicate with the unmanned aerial robot; and
a processor configured to control the driving device to move the first cover portion and the second cover portion to the opened position and to move the elevator up to expose the landing surface, when access information of the unmanned aerial robot is provided from the communication module.

14. The station of claim 13, wherein when the unmanned aerial robot lands on the landing stand, the processor controls the driving device to move the elevator down.

15. The station of claim 14, wherein the landing stand includes a pressure sensor, and
the processor determines whether the unmanned aerial robot lands based on a sensing result of the pressure sensor.

16. The station of claim 14, further comprising:
an image acquirer configured to acquire images around the landing stand,
wherein the processor determines whether the unmanned aerial robot lands based on the image acquired by the image acquirer.

17. A landing station for an unmanned aerial robot, the landing station comprising:
a control box having a landing surface;
an elevator disposed in the control box and configured to move along a vertical axis;
a landing stand coupled to the elevator and configured to receive the unmanned aerial robot; and
a processor configured to:
control the elevator to move upwards along the vertical axis to move the landing stand to a top position vertically spaced from the landing surface of the control box to receive the unmanned aerial robot, and
when the unmanned aerial robot lands on the landing stand, control the elevator to move downwards along the vertical axis to move the landing stand to a bottom position inside of the control box.

18. The landing station of claim 17, wherein the control box further includes:
a first cover portion; and
a second cover portion,
wherein the first cover portion and the second cover portion are configured to move along a horizontal axis being perpendicular to the vertical axis.

19. The landing station of claim 18, wherein when the unmanned aerial robot lands on the landing stand and before the landing stand is moved, by the elevator, to the bottom position, the processor is configured to move the first cover portion and the second cover portion towards one another along the horizontal axis to a closed position,
   wherein in the closed position, the first cover portion contacts the second cover portion.

20. The landing station of claim 18, wherein before the elevator moves to the top position, the processor is configured to move the first cover portion and the second cover portion from a closed position to an open position,
   wherein in the closed position, the first cover portion contacts the second cover portion, and
   wherein in the open position, the first cover portion is spaced apart from the second cover portion to allow the unmanned aerial robot to land on the landing stand.

\* \* \* \* \*